United States Patent Office 3,276,191
Patented Oct. 4, 1966

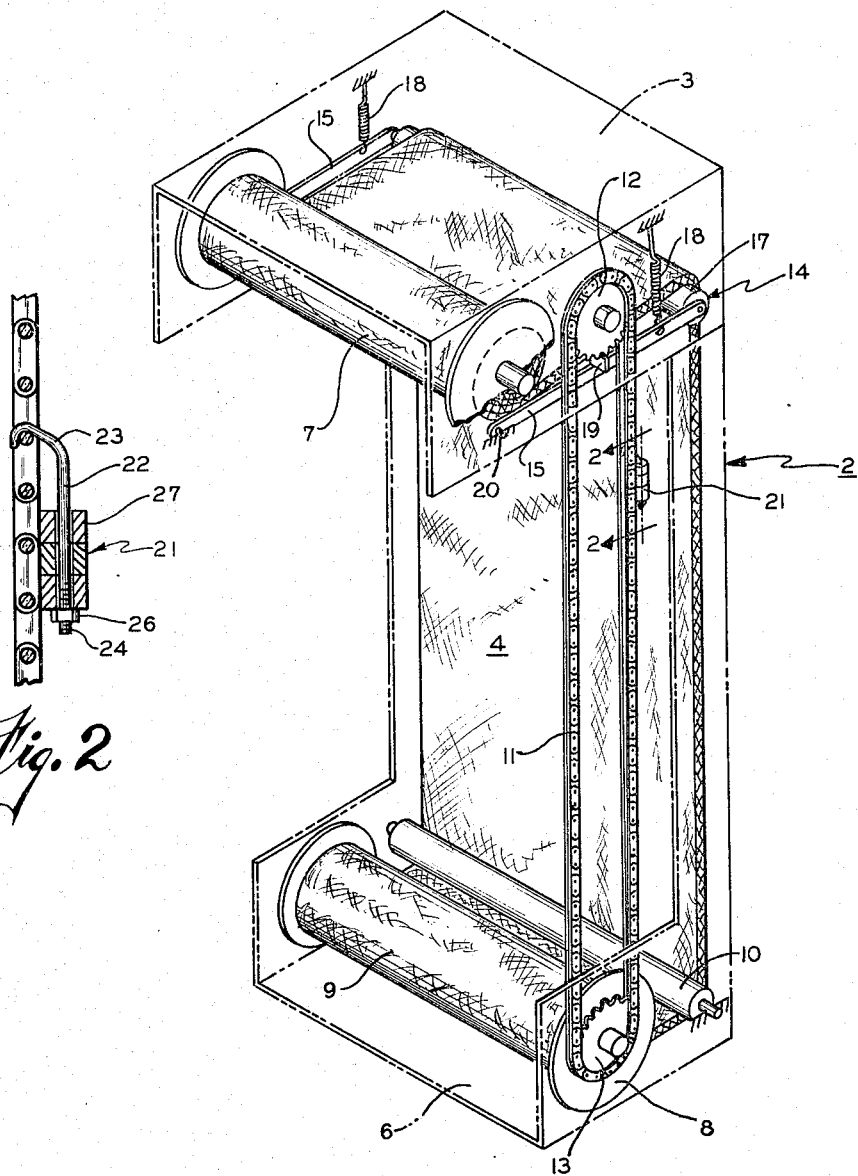

3,276,191
CONTROL APPARATUS FOR ADVANCING A FILTER MEDIUM WEB THROUGH A GAS TREATING SECTION
Alan E. Revell, Louisville, Ky., assignor to American Air Filter Company, Inc., Louisville, Ky., a corporation of Delaware
Filed Oct. 3, 1963, Ser. No. 313,674
1 Claim. (Cl. 55—354)

The present invention relates to gas filters of the type wherein filter medium is moved from a supply zone through a gas filtering zone to a take-up zone. More particularly, the present invention relates to an improved control system for advancing a web of filter medium in such type gas filters.

Various types of arrangements have been employed in the past to incrementally advance filter medium across a gas filtering zone in an attempt to insure efficient utilization of exposed filter medium at controlled gas flow resistances. For the most part, these arrangements have been expensive in construction and maintenance, have been comparatively complex in design, requiring an extensive number of operating parts, and have depended upon an external source of power.

In accordance with the present invention, an improved filter medium advance control system is provided which minimizes these past disadvantages, the arrangement of the present invention requiring no external source of power for its operation to permit its use in areas where external power is not readily available or its use expedient. Further, the arrangement of the present invention is comparatively simple and straightforward in its construction and operation, requiring a minimum of operating parts and a minimum of maintenance.

Various other features of the present invention will become obvious to one skilled in the art upon reading the disclosure set forth herein.

More specifically, the present invention provides a filter medium advance control system for gas filter apparatus wherein advance of a web of filter medium in a supply zone thereof through a gas filtering zone is effected by rewinding the filter medium on a rewind spool in a discharge zone comprising: a first means to rotate the rewind spool; and, a second means responsive to added forces on said filter medium in the gas filter zone to actuate the first means and thereby advance the filter medium in relationship to the dust load accumulated on the medium.

It is to be understood that various changes can be made in the arrangement, form and construction of the apparatus disclosed herein without departing from the scope or spirit of the present invention.

Referring to the drawing, which discloses an advantageous embodiment of the present invention:

FIGURE 1 is a schematic, isometric view of a gas filter apparatus of the automatic type including a web advance control system of the present invention; and, FIGURE 2 is an enlarged, side view of a portion of the endless chain and weight arrangement disclosed in FIGURE 1 of the drawing.

Referring to FIGURE 1 of the drawing, a roll type filter housing 2 is disclosed in vertical position. Housing 2, which can be made of a suitable gauge sheet metal, includes top filter medium supply zone 3, central gas filtering zone 4 and bottom filter medium take-up zone 6. Mounted in wound form in supply zone 3 is filter medium supply roll 7. Roll 7 can be comprised of a web of any one of a number of known and suitable filter medium materials. For example, a suitable glass fiber material of interconnected and bonded glass fibers can be used.

In operation, web 7 is advanced incrementally from time-to-time into and through central gas treating zone 4 which frames the gas stream passage through which a gas stream to be treated must flow. Web 7 is then correspondingly progressively advanced to take-up zone 6 where it is passed around idle roller 10 and wound upon rewind spool 8 into discharge roll 9 which can be ultimately thrown away or reconditioned for further use.

The novel web advance control system to advance web 7 includes endless chain 11 mounted on spaced sprocket members 12 and 13. Upper sprocket member 12, which is an idle sprocket, is rotatably mounted in one side wall of supply zone 3 and lower sprocket member 13 is fixed to the shaft of rewind spool 8 in take-up zone 6. Pivotally mounted to the walls of housing 2 in supply zone 3 below sprocket member 12 is yoke member 14. Yoke member 14 includes a pair of spaced, parallel arm members 15 pivotally mounted through pin 20 to housing 2 at one end thereof and serving to rotatably support roll member 17 at the opposite end thereof so that such roll member 17 extends below filter medium web 7. Roll member 17 is held in yieldable engagement against web 7 by means of a pair of helical suspension springs 18, each of which is fastened at one end to one of the pair of side arms 15 and anchored at its other end to the side wall of housing 2 in supply zone 3. A suitable detent member 19 is fixed to that leg member 15 pivotally mounted on the same side wall of housing 2 as sprocket member 12. It is to be noted that detent member 19 is positioned on leg member 15 to yieldably engage with the teeth of sprocket 12 in order to hold the sprocket in locked position. In order to move endless chain 11 when detent 19 is disengaged from the teeth of sprocket 12, a suitable weight apparatus 21 is provided to be suspended from one of the links of endless chain 11 (FIGURE 2). Weight apparatus 21 includes rod 22 having hooked portion 23 at one end thereof and threaded portiton 24 at the opposite end adapted to receive stop nut 26. A suitable number of apertured, ring shaped weights 27 are suspended on rod 22 and held in position by stop nut 26. The number of weights used depends upon such factors as the nature of the gas stream to be treated and the type of filter medium used in the gas stream.

In operation, the weight apparatus 21 is suspended at the top of endless chain 11 with the force of the weights being selected to provide sufficient torque on rewind spool 8. The detent 19 is normally urged into engagement with the teeth of sprocket 12 to hold endless chain 11 in fast, locked position. As the gas stream passes through the web of filter medium 7, dust adheres to the filter medium, and, eventually, the added load of the dust in the media and the increased gas pressure thereon because of increased resistance becomes so great that the force thereof pulls down on roll member 17 to pivot yoke member 14 downwardly and cause detent 19 to disengage from the teeth of sprocket 12. When this occurs, weight member 21 moves endless chain 11. It will be understood that in the absence of actuation by weight member 21, the resistance to the turning of roll 7 will be such that the roll will not unwind. The sprocket 13 and the rewind spool 8 to which sprocket 13 is attached are in turn rotated by the moving chain, causing the filter medium to be rolled on the spool. As clean medium is introduced into the gas stream, the overall filter medium load decreases to a point where the suspension spring 18 urges the yoke member 14 and its roll 15 upwardly to the position where detent 19 again engages with the teeth of sprocket 12 and movement of chain 11 is stopped.

It is to be understood that various gear ratios can be used with the chain and sprocket arrangement aforedescribed in order to rotate rewind spool 8 a preselected amount in accordance with a preselected incremental movement of the chain 11.

The invention claimed is:

Gas filter apparatus comprising a housing having a supply section at one end thereof for storing a web of elongated filter medium in roll form; a take-up section at the opposite end thereof to receive and take up in roll form on a rewind spool spent filter medium; a gas-treating, flow-through section intermediate said supply and take-up section; a weighted endless chain drive including an endless chain extending between a pair of spaced supporting sprockets, one of which is connected to said rewind spool to rotate said spool; a detent positioned to engage one of said supporting sprockets of said endless chain; and a pivotally-mounted, spring-biased yoke member connected to said detent to urge said detent into engagement with said sprocket, said yoke member including a displaceable roll member over which said filter medium passes to pivot to yoke member in a direction opposite said spring biasing in accordance with the dust load weight accumulated thereon to release said detent from engagement with said sprocket and operate said chain drive to advance the filter medium in relationship to the accumulated dust load weight thereon.

References Cited by the Applicant

UNITED STATES PATENTS

| | | | |
|---|---|---|---|
| 1,012,500 | 12/1911 | Aitken | 210—157 |
| 1,977,720 | 10/1934 | Fowler | 242—75.2 |
| 1,982,639 | 12/1934 | Christofferson. | |
| 2,045,496 | 6/1936 | Skinner | 55—215 X |
| 2,162,325 | 6/1939 | Briles | 210—160 X |
| 2,218,453 | 10/1940 | Mickle | 55—354 |
| 2,300,705 | 11/1942 | Schott. | |
| 2,598,950 | 6/1952 | Walker | 242—57 |
| 2,626,012 | 1/1953 | Persons | 55—271 X |
| 2,860,731 | 11/1958 | Hause | 188—69 |
| 2,963,115 | 12/1960 | Peras | 188—69 |
| 2,981,388 | 4/1961 | Peras | 188—69 X |
| 3,043,403 | 7/1962 | Kelley | 188—69 |
| 3,102,014 | 8/1963 | Aitkenhead | 55—271 |
| 3,175,775 | 3/1965 | Wurthenberg et al. | 55—271 X |

FOREIGN PATENTS

| | | |
|---|---|---|
| 501,531 | 3/1951 | Belgium. |
| 781,957 | 3/1935 | France. |
| 896,068 | 4/1944 | France. |
| 20,134 | 12/1882 | Germany. |
| 491,861 | 9/1938 | Great Britain. |
| 499,911 | 11/1954 | Italy. |

HARRY B. THORNTON, *Primary Examiner.*

D. E. TALBERT, JR., *Assistant Examiner.*